United States Patent
Chapman et al.

[15] 3,656,982
[45] Apr. 18, 1972

[54] PEARLESCENT PIGMENT

[72] Inventors: Douglas W. Chapman, Normandy; Wilbur H. McKellin, Creve Coeur; R. Dean Overley, St. Louis, all of Mo.

[73] Assignee: Mallinckrodt Chemical Works, St. Louis, Mo.

[22] Filed: May 4, 1970

[21] Appl. No.: 34,585

[52] U.S. Cl. .....................106/291, 106/308 Q, 106/308 F, 106/308 N, 106/308 S
[51] Int. Cl. ...........................................C09c 3/02
[58] Field of Search...............106/291, 308 S, 308 Q, 308 F, 106/308 N

[56] References Cited

UNITED STATES PATENTS 3,262,802  7/1966  Young et al. .........................106/291
3,025,179  3/1962  Holbein .............................106/308 Q Primary Examiner—James E. Poer
Attorney—John D. Pope, III

[57] ABSTRACT

The luster, compressibility and other cosmetically important properties of various pearlescent pigments are substantially improved by coating the surface of the pigment particles with a composition comprising a precipitated water-insoluble metal stearate and a surfactant.

8 Claims, No Drawings

PEARLESCENT PIGMENT

BACKGROUND

The present invention relates to the field of pearlescent pigments and more particularly to improved pearlescent pigments for use in various cosmetic formulations.

Certain synthetic pigments are widely used to impart a pearl-like luster to various substances. Among those most widely used in cosmetic formulations are bismuth oxychloride and mica platelets coated with either bismuth oxychloride or titanium dioxide. While generally satisfactory, these materials are often excessively bulky and deficient in certain properties which are desirable for cosmetic applications, notably "slip," "cling" and compressibility. These properties are closely related to the lubricity of the pigment particles. Various metal soaps such as calcium and magnesium stearates are widely used as dry lubricants as for example in the manufacture of tablets where the powdered soap is mixed or blended with the other components of the tablet. When, however, these soaps are used in a similar manner with the above-described pearlescent pigments the expected improvement in the slip and compressibility is not realized, and in addition the pearlescent luster of the pigment is considerably dulled.

It is also known to provide various pigments with a film or coating of a fatty acid or metal soap dissolved or dispersed in some suitable liquid media. In that case the resulting products are in the form of a more or less sticky paste or suspension rather than in the form of dry free-flowing particles which are the more useful and desirable.

The term "soap" is used herein to mean a salt of a higher substantially saturated fatty acid or mixture of acids such as palmitic, stearic, myristic, etc.; i.e. a saturated aliphatic acid, essentially straight-chained and containing 12–20 carbon atoms.

Among the objects of the present invention may therefore be noted the provision of novel pearlescent pigments in the form of substantially dry free-flowing particles characterized by their improved slip and cling and by their improved compressibility. A further object is the provision of methods for treating certain pearlescent pigments in order to substantially increase their usefulness for cosmetic applications, especially in compressed powders. Other objects and features will be in part apparent and in part pointed out hereinafter.

The invention accordingly comprises the products and methods hereinafter described, the scope of the invention being indicated in the following claims.

SUMMARY OF THE INVENTION

The present invention is directed to an improved pearlescent pigment in the form of substantially dry free-flowing particles consisting essentially of pearlescent base, the particles of which are substantially covered with a precipitated coating comprising an insoluble metal soap. Moreover, a surfactant may advantageously be incorporated in the said metal soap coating.

The invention is also directed to a method for treating pearlescent pigments which comprises suspending the pearlescent pigment in water; dispersing a water-soluble salt of a fatty acid in the said suspension and gradually adding to the said suspension an aqueous solution containing cations which form a water-insoluble soap. Optionally, a water-insoluble surfactant may be added to the reaction mixture during or following the precipitation of the metal soap.

DESCRIPTION OF THE PREFERRED EMBODIMENTS

The present invention is particularly useful and beneficial in conjunction with pearlescent pigments which are to be incorporated in compressed cosmetic powders. Of these the most commonly used are bismuth oxychloride crystals and mica platelets coated with bismuth oxychloride or titanium dioxide. The pearlescent base pigment may additionally contain a colored pigment as described in copending applications of Douglas W. Chapman and R. Dean Overley, Ser. No. 876,992, filed Nov. 14, 1969, and of Douglas W. Chapman, R. Dean Overley, Robert D. Rands, Jr. and Ronald S. Schreiber, Ser. No. 15,887, filed Mar. 2, 1970 both now abandoned.

In a simple embodiment of the invention the surface of the pearlescent pigment particles is first coated with an intimate adherent film or deposit of an insoluble metal soap, such as for example calcium stearate or magnesium stearate. This is accomplished by forming and precipitating the metal soap in an aqueous suspension of the pearlescent pigment. The coating obtained in this manner is much more adherent than if the preformed metal soap is merely admixed with the pigment. An intimate adherent coating results which substantially improves the compressibility and lubricity of the pigment particles, thereby increasing their compatibility and effectiveness in many cosmetic formulations, especially compressed powders. In addition the precipitated metal soap coating does not substantially dull the luster of the pigment but in some instances appears to enhance the luster. Merely admixing a preformed metal soap with the pigment dulls the pigment luster if it does not obscure it.

When a dry pearlescent pigment is coated with a water-insoluble metal soap alone, it becomes hydrophobic or water-repellent, and this may be a serious disadvantage for certain applications, as in the case of certain compressed powders which are applied with the aid of a moistened brush. It has been found that the incorporation of a suitable surfactant in the coating not only makes the pigments wettable but certain surfactants act synergistically with the stearate to effect a further substantial and surprising improvement in the compressibility of the pigment.

Water-insoluble nonionic surfactants have been found to be generally more effective and are therefore preferred. It is also desirable that the surfactant have an HLB value (hydrophylic-lipophylic-balance) in the middle portion of the range. A low HLB value (hydrophylic-lipophylic-balance) indicates that the surfactant is predominantly lipophylic, whereas a high value indicates that it is predominantly hydrophylic. Surfactants having HLB values in the range from about 5 to about 16 and preferably about 10 have been found to be the most useful. Among the commercially available surfactants which have been found useful for the purposes of the present invention may be noted:

| Chemical composition | Trade name | Manufacturer | Type | HLB |
|---|---|---|---|---|
| 100% sorbitan monolaurate | Arlacel 20 | Atlas | Nonionic | 8.6 |
| 100% polyoxyethyelene (2) cetyl ether | BRIJ 58 | do | do | 15.7 |
| 100% polyoxyethyelene (10) stearyl ether | BRIJ 76 | do | do | 12.4 |
| 100% sorbitan monostearate | Span 60 | do | do | 4.7 |
| 100% polyoxyethylene sorbitan monolaurate (polysorbate 20) | Tween 20 | do | do | 16.7 |
| 100% polyethylene (4) sorbitan monostearate | Tween 61 | do | do | 9.6 |
| 100% polyoxyethylene sorbitan monooleate | Tween 81 | do | do | 10.0 |
| 100% diisobutylcresoyl-ethoxyethyl dimethyl benzyl ammonium chloride | Hyamine 10-X | Rohm & Haas | Cationic | |
| 100% nonylphenoxypolyethoxyethanol | Triton N-57 | do | Nonionic | |
| 30% sodium salt of alkylaryl polyether sulfonate | Triton X-202 | do | Anionic | |
| 100% polyoxyethylene (8) stearate | MYRJ 45 | Atlas | Nonionic | 11.1 |
| 100% polyoxyethylene (40) stearate | MYRJ 52 | do | do | 16.9 |
| 100% dioctyl sodium sulfosuccinate | Aerosol OT | American Cyanamid | Anionic | |
| 100% sodium linear alkylate sulfonate | Ultrawet K | Atlantic Richfield | do | |
| 100% phosphate acid | Triton QS 30 | Rohm & Haas | do | |
| 100% ethoxylated lanolin | Ethoxylan 100 | Malmstrom | Nonionic | |

The surfactant may be incorporated in the metal soap coating in any convenient manner, as for example by adding an aqueous dispersion of the surfactant to the aqueous pigment suspension after the precipitation of the metal soap. Alternatively, the surfactant may be added simultaneously with the metal salt used to precipitate the soap.

A coating comprising about 1% calcium stearate and 1% of the surfactant based on the weight of the pigment is usually sufficient. Heavier coatings may be applied but these seem to provide little additional benefit. If the coating is too thick it may dull rather than increase the luster of the pearlescent base or it may have other undesirable effects. Generally speaking, the optimum coating thickness falls within the range from about 0.5 to about 5% of the weight of the pigment.

The following examples illustrate the invention.

EXAMPLE 1

The following illustrates a simple embodiment of the invention wherein a pearlescent pigment is coated with an alkaline earth metal stearate to improve its compressibility. A mixture containing 5 g. of ammonium stearate in 2 liters of water was heated to disperse the stearate, and to it was added 500 g. of a pearlescent base consisting of mica platelets coated with bismuth oxychloride, (bismuth oxychloride constituting 40% of the total weight of the pigment). An alkali metal stearate such as sodium or potassium stearate may be used in place of ammonium stearate. Pearlescent pigments of this kind are more fully described in the copending application of Robert D. Rands, Jr. and Douglas W. Chapman, Ser. No. 766,614, filed Oct. 10, 1968, now U.S. Pat. No. 3,597,250. The resulting slurry was cooled to room temperature and diluted with water to 3 liters. A solution containing 1.73 g. $MgCl_2.6H_2O$ in 150 ml. of water was added with stirring to precipitate magnesium stearate. The product was collected on a filter, washed with water and dried at 80° C. overnight. It contained 1% magnesium stearate in the form of an intimate adherent coating.

EXAMPLE 2

In the following example a water-insoluble surfactant is incorporated in a calcium stearate coating.

Calcium stearate was precipitated on a pearlescent mica-BiOCl slurry as described in Example 1, and to the resulting slurry was added over a period of about 20 minutes a hot dispersion of 5 g. of Tween 61 in 250 ml. of distilled water. The product was collected on a filter, washed, dried overnight at 80° C., and then passed through a 60 mesh sieve. It contained approximately 1% calcium stearate and 1% of the surfactant.

Other surfactants such as BRIJ 58, Tween 20 and Tween 81 may be substituted for the Tween 61 and incorporated in a similar manner.

EXAMPLE 3

The invention is also applicable to pearlescent pigments colored with an appropriate metal oxide or other insoluble colored substance of the kind disclosed in copending applications, Ser. No. 876,992 and Ser. No. 15,887 mentioned above. To 650 ml. of distilled water was added 5 g. of sodium stearate and the mixture was heated until the stearate dissolved. This was poured slowly into a stirred suspension of 500 g. of a yellow pearlescent base which consisted of mica coated with bismuth oxychloride and having deposited thereon a yellow iron oxide as described more fully in copending application, Ser. No. 876,992, Example 4. Stirring was continued and a solution containing 1.25 g. $CaCl_2.2H_2O$ in 250 ml. of distilled water was gradually added over a period of about 30 minutes. The dried product contained 1% calcium stearate in the form of an intimate adherent coating.

EXAMPLE 4

The invention is also applicable to titanated mica, i.e. mica platelets coated with titanium dioxide, as in the following:

A mixture of 1 g. ammonium stearate in 130 ml. distilled water was heated to disperse the stearate and then slowly added to a stirred suspension of 100 g. titanated mica ("Pearl Afflair" manufactured by duPont) in 300 ml. distilled water. Stirring was continued and a solution of 0.25 g. of $CaCl_2.2H_2O$ in 50 ml. water was added dropwise during one-half hour. The product was collected and dried as before. It contained approximately 1% calcium stearate in the form of an intimate adherent coating.

EXAMPLE 5

Metal salts other than calcium and magnesium may be used to precipitate an insoluble stearate coating, with or without the inclusion of a wetting agent, as follows: To a stirred slurry of 100 g. of 40% BiOCl by weight on mica in 300 ml. of distilled water was added a hot dispersion of 1 g. of ammonium stearate in 100 ml. of distilled water. Stirring was continued and during 15 min. a solution of 0.62 g. $Al(NO_3)_3.9H_2O$ in 50 ml. of distilled water was added dropwise. Stirring was continued for 15 minutes then the mixture split into two equal parts, A and B. A was collected, washed with 2 × 50 ml. of distilled water and dried in the steam oven. B was stirred and a hot dispersion of 0.5 g. of Tween 61 poured in. Stirring was continued for 15 minutes, the product collected and treated like A. After drying both were put through a 60 mesh sieve. A and B contained 1% aluminum distearate and B contained in addition 1% Tween 61.

Alternatively the pearlescent base may be coated with other stearates such as nickel stearate, zinc stearate and ferric stearate in a similar manner.

EXAMPLE 6

Nacreous bismuth oxychloride crystals were coated with 0.5% calcium stearate with and without 1% Tween 61 in a manner similar to that described in Example 1. To a stirred suspension of 200 g. of nacreous BiOCl crystals in 500 ml. of distilled water was added slowly a hot dispersion of 1 g. of ammonium stearate in 200 ml. of distilled water. The mixture was stirred 15 minutes, then a solution of 0.25 g. $CaCl_2.2H_2O$ in 50 ml. of water was added dropwise during 15 minutes. One-half of this mixture (A) was set aside. To the other half (B) was added a hot dispersion of 1 g. of Tween 61 in 100 ml. of distilled water. Both A and B were collected, washed with 2 × 50 ml. of water, dried in the steam oven and passed through a 60 mesh sieve.

Both A (hydrophobic) and B (wettable) showed improved slip and compressibility compared with the original crystals, but B which also contained Tween 61 was significantly better than A which contained only the stearate.

EXAMPLE 7

Other surfactants may be used in a manner similar to that described for Tween 61. To a slurry of 300 g. of 40% BiOCl by weight on mica in 900 ml. of distilled water a hot dispersion of 3 g. of sodium stearate in 390 ml. of distilled water was added with stirring during 20 minutes. A solution of 0.75 g. of $CaCl_2 \cdot 2H_2O$ in 150 ml. of distilled water was added dropwise to the stirred mixture. The resulting slurry was then split into three 500 ml. portions (A, B and C). A dispersion of 1 g. Hyamine 10-X in 100 ml. of distilled water was added during 15 minutes to portion A. Similarly dispersions of 1 g. of Triton N-57 in 100 ml. of distilled water and 3.3 g. of 30% solution of Triton X-202 in 100 ml. of distilled water were added to portions B and C respectively. A, B and C were collected and dried. All of the treated samples were wettable, with Triton N-57 showing the greatest improvement in slip and compressibility. Other wetting agents which can be used in a similar manner are BRIJ 58, Tween 20 and Tween 81.

EXAMPLE 8

If desired, the surfactant may be added prior to precipitation of the insoluble metal salt as in the following. To a series of stirred slurries of 100 g. of 40% BiOCl by weight on mica in 300 ml. of distilled water were added hot suspensions of 1 g. of MYRJ 52 (A), BRIJ 76 (B) or Span 60 (C) and 1 g. of ammonium stearate. During 15 minutes a solution of 0.25 g. of $CaCl_2 \cdot 2H_2O$ in 50 ml. of distilled water was added dropwise to each. Suspensions A, B and C were collected, washed with 100 ml. of distilled water, dried in a steam cabinet and put through a 60 mesh sieve.

All the treated samples showed substantial improvement in cling and slip compared with the original pigment.

EXAMPLE 9

If desired, the surfactant may be added as an alcoholic solution rather than as an aqueous dispersion as in the preceding examples. To a stirred slurry of 20 g. of 40% BiOCl by weight on mica coated with 1% calcium stearate in 200 ml. of distilled water was slowly added a solution of 0.2 g. of Arlacel 20 in 10 ml. of alcohol. The mixture was collected, washed with 100 ml. of distilled water, and dried.

EXAMPLE 10

Lauric acid, or other higher fatty acids may be substituted for ammonium stearate as follows. Into a stirred slurry of 100 g. of 40% BiOCl by weight on mica in 300 ml. of distilled water was slowly poured 1 g. of lauric acid dispersed with several drops of $NH_4OH$ in 150 ml. of hot distilled water. During one-half hour a solution of 0.37 g. $CaCl_2.2H_2O$ in 100 ml. of distilled water was added. Subsequently, a hot dispersion of 1 g. Tween 61 in 100 ml. of distilled water was added. The resulting suspension was collected, washed with 200 ml. of distilled water, dried in a steam cabinet, and passed through a 60 mesh sieve.

EXAMPLE 11

The improved compressibility of pearlescent pigments treated in accordance with the present invention can be demonstrated quantitatively with the aid of an instrument known as a Textur-O-Meter (manufactured by C. W. Brabender Instruments, Inc., South Hackensack, N. J.). Essentially the instrument measures the resistance of the test material to compression under carefully standardized conditions. A standard weight of the test material is first compressed in a suitable container, e.g. a cylindrical dish, to a standard volume. A plunger is then pressed against the test sample and the resistance offered by the sample is measured electronically. Although not numerically reproducible, test results for different materials show a relative relationship when the tests are carried out as a series utilizing the same test conditions.

In a series of samples tested under identical conditions, the lower the resistance the greater are the slip and compressibility (these properties being interrelated). It should be emphasized again that as used herein "compressibility" refers to the ease with which a material can be compressed, and not to the density or hardness of the compressed material. If the sample is in the form of a dense hard cake, its resistance to further compression will of course be high, and therefore it will be of low "compressibility."

The same pearlescent base (40% bismuth oxychloride on mica platelets was treated with 1% calcium stearate alone and with 1% calcium stearate plus 1% Tween 61. The compressibility of these materials was then compared using the Textur-O-Meter (20 g. samples, 5 volts and 1/5 attenuation).

| Sample | Coating | | Resistance |
|---|---|---|---|
| | Calcium Stearate | Tween 61 | |
| A | 0 | 0 | 10.4 |
| B | 1% | 0 | 2.3 |
| C | 1% | 1% | 1.0 |

Using 20 g. samples compressed to equal dimensions (56 mm. diameter, 16 mm. height) and instrument settings of 5 volts and one-fifth attenuation and using a 20 mm. diameter plunger, an untreated 40% BiOCl on mica gave a peak reading of 8.50. When physically blended with 1% calcium stearate the peak reading was 9.00, indicating a decrease in its compressibility. The same pigment when coated with 1% calcium stearate and 1% Tween 61 in accordance with the present invention gave a peak reading of only 0.1 (extrapolated) under the same conditions.

Likewise a 15 g. sample of untreated $TiO_2$-mica pigment gave a peak reading of 7.30. When coated with 1% calcium stearate (cf. Example 4) the peak reading was only 2.89.

Using 20 g. samples at 10 volts and 1/5 attenuation with a 20 mm. diameter plunger the following typical results were obtained with a 40% BiOCl on mica pigment:

TABLE I

| Stearate | Wetting Agent | Resistance |
|---|---|---|
| 1% Ca Stearate | 1% Tween 61 | 4.22 |
| 1% Ca Stearate | 1% Hyamine 10-X | 10.4 |
| 1% Ca Stearate | 1% Triton N-57 | 8.64 |
| 1% Ca Stearate | 1% Triton X-202 | 11.2 |
| 1% Ca Laurate | 1% Tween 61 | 6.78 |

It should be noted that the two nonionic surfactants Tween 61 and Triton N-57) gave better results by this test than either the cationic (Hyamine 10-X) or or anionic (Triton X-202) agent.

Another series of samples compared the effect of various metal soaps (1%) with and without 1% Tween 61. The conditions were the same as in the preceding series.

TABLE II

| Metal Soap | Wetting Agent | Resistance |
|---|---|---|
| Ca Stearate | Tween 61 | 3.22 |
| Al Stearate | None | 5.51 |
| Al Stearate | Tween 61 | 4.83 |
| Ni Stearate | None | 5.19 |
| Ni Stearate | Tween 61 | 6.01 |
| Zn Stearate | None | 11.7 |
| Zn Stearate | Tween 61 | 4.62 |
| Fe Stearate | None | 10.3 |
| Fe Stearate | Tween 61 | 8.61 |

In all but one instance (nickel stearate) the Tween 61 acted synergistically with the metal soap to effect a significant reduction in the compressibility of the treated pigment.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A pigment comprising a pearlescent substance selected from bismuth oxychloride platelets, mica platelets coated with bismuth oxychloride and mica platelets coated with titanium dioxide, the surfaces of the pigment particles being substantially completely covered with an intimate adherent precipitated coating comprising a water-insoluble metal soap and a water-insoluble surfactant, said pigment being in the form of substantially dry free-flowing particles having greater compressibility and slip than pigment particles without the coating.

2. A pigment according to claim 1 wherein the wetting agent is a nonionic surfactant having an HLB value in the range of 5 to 16.

3. A pigment according to claim 1 wherein the surfactant is a polyoxyethylene derivative having an HLB value of about 10.

4. A pigment according to claim 1 wherein the metal soap is an alkaline earth salt of a saturated fatty acid having 12–20 carbon atoms.

5. Method for treating a pearlescent pigment selected from bismuth oxychloride platelets, mica platelets coated with bismuth oxychloride and mica platelets coated with titanium dioxide, which comprises suspending the pigment in water; dispersing a water-soluble salt of a higher fatty acid in the suspension; gradually adding to the said suspension an aqueous solution containing cations which form an insoluble soap; adding to said suspension an aqueous dispersion of a water-insoluble surfactant; and recovering the pearlescent pigment in the form of substantially dry free-flowing particles.

6. Method of claim 5 wherein the surfactant has an HLB value in the range of 5 to 16.

7. Method of claim 5 wherein the surfactant is a polyoxyethylene derivative having an HLB value of about 10.

8. Method of claim 5 wherein the soap is an alkaline earth salt of a saturated fatty acid having 12–20 carbon atoms.

* * * * *